United States Patent

[11] 3,610,509

| [72] | Inventor | Thomas W. Winstead<br>P.O. Box 308 18030 Gilroy Road,<br>Cockeysville, Md. 21030 |
|---|---|---|
| [21] | Appl. No. | 840,084 |
| [22] | Filed | May 27, 1969 |
| [45] | Patented | Oct. 5, 1971<br>Continuation-in-part of application Ser. No.<br>506,804, Nov. 8, 1965, now abandoned. |

[54] SKIN-COATED ARTICLE FORMED OF FOAMED THERMOPLASTIC MATERIAL
10 Claims, 5 Drawing Figs.

| [52] | U.S. Cl. | 229/2.5 |
|---|---|---|
| [51] | Int. Cl. | B65d 1/34 |
| [50] | Field of Search | 264/48, 53;<br>99/174; 229/2.5 |

[56] References Cited
UNITED STATES PATENTS

| 3,275,179 | 9/1966 | Lux et al. | 220/9 F X |
|---|---|---|---|
| 2,737,503 | 3/1956 | Spragub et al. | 260/2.5 |
| 3,893,877 | 7/1959 | Nickolls | 99/174 |
| 3,040,948 | 6/1962 | Wells | 229/2.5 |
| 3,050,402 | 8/1962 | Dreyfus et al. | 99/171 |
| 3,074,798 | 1/1963 | Palmer | 99/174 |
| 3,092,246 | 6/1963 | Harrison et al. | 99/174 UX |
| 3,151,192 | 9/1964 | Jacobs et al. | 264/53 |
| 3,160,688 | 12/1964 | Aykamiam et al. | 264/53 |
| 3,311,681 | 3/1967 | Cherney et al. | 264/48 |
| 3,391,051 | 7/1968 | Ehrenfreund et al. | 264/48 |
| 3,461,496 | 8/1969 | Winstead | 18/12 |

*Primary Examiner*—Leonard Summer
*Attorney*—Raphael Semmes

ABSTRACT: An article of manufacture such as a food-packaging tray, formed of extruded thermoplastic material having an inelastic and permanently deformable expanded, open-celled core of low density and an unexpanded, biaxially oriented, high density skin of said thermoplastic material, molecularly integral with the expanded core, covering at least one surface of the core to provide a stiffening shield. The inner surface of a receptacle of the invention may be free of the skin, so that permanent depressions may be formed by fruit, for example. Drain apertures may be provided through an inner skin to provide access to the absorbent core.

PATENTED OCT 5 1971

3,610,509

INVENTOR
THOMAS W. WINSTEAD

BY Raphael Semmes
ATTORNEY

SKIN-COATED ARTICLE FORMED OF FOAMED THERMOPLASTIC MATERIAL

This application is a continuation-in-part of my copending application Ser. No. 506,804, filed Nov. 8, 1965, now abandoned.

The invention relates to articles manufactured of foamed plastic material, and consists more particularly in new and useful improvements in thermoplastic articles, such as containers, plates, trays, mats, coasters, etc. formed of extruded thermoplastic material, the inner structure of which is foamed or expanded and including at least one surface covering or skin of unexpanded thermoplastic which is molecularly integral with said expanded structure.

These foamed thermoplastics may include polyvinylchloride, polystyrene, polyethylene and polypropylene as the basic material to be extruded, and ordinary volatile liquids, such as pentane, trichlorofluoromethane, acetone, other fluorocarbons, or other suitable materials which are somewhat soluble in certain thermoplastics, are added to the charging stock as blowing agents. Gas under pressure may also be used, but, in this case, a solvent should be added. The liquid material will remain in the liquid phase under certain temperatures and pressures, and when the pressure is reduced, the liquids form a gas which, when the material is extruded, causes the thermoplastic substance to foam.

Heretofore, trays for use in packaging food products, for example, have been made of pulp or paperboard, and more recently of plastic materials.

The use of foamed thermoplastic materials is particularly well suited for this type of product because of the low cost inherent in such materials. However, such articles, when manufactured of conventionally extruded foamed thermoplastics, have had certain disadvantages because of their lack of the rigidity or stiffness required for certain uses.

It is therefore the primary object of the present invention to provide an improved tray or similar article formed of foamed thermoplastic which will be more suitable for the desired applications than the foamed trays currently manufactured for this market.

Another object of the invention is to provide a tray or similar article of manufacture having an open-celled, substantially absorbent and deformable basic structure which is covered on one or both surfaces with an integral, biaxially oriented skin of said thermoplastic material which is unexpanded and nonabsorbent and provides a solid stiffening shield for the article.

Still another object of the invention is to provide an article of this character wherein the covering skin is not laminated to the basic structure, but is actually molecularly integral with and a part thereof, with only a change in density from an extremely dense, solid, outer surface to a relatively thick lining of extremely low density.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views;

FIG. 3 illustrates one advantageous use of the invention in the packaging of fruit or the like;

I have found that by controlling the temperature of one or both surfaces of a foamed thermoplastic sheet immediately after it is extruded, such surface or surfaces can be prevented from expanding and foaming. For example, when it is desired to produce a sheet or layer of foamed thermoplastic having one surface coated with an unexpanded skin, the cooling of said surface by any suitable means, such as a cooled plate, the application of cooled air, or other conventional cooling means, immediately after the sheet leaves the extrusion die lips but before actual expansion or foaming takes place, the cooled surface of the sheet forms a skinlike covering which is molecularly an integral part of the underlying foamed resin, as distinguished from interfaces, laminates or bonded layers. A method for producing such a skin-coated thermoplastic sheet is described in my application for U.S. Pat. Ser. No. 506,805, filed Nov. 8, 1965, now Pat. No. 3,461,496, issued Aug. 19, 1969.

One of the important features of the product of the present invention resides in the physical characteristics thereof which result from the method and apparatus employed in the extrusion operation as explained in said copending application. In that application, it is explained that an interesting effect can be achieved having to do with the orientation of the skin which is particularly important to the overall strength of the final extrudate or formed product. Biaxial orientation occurs because the skin has been chilled to a point where further stretching causes molecular orientation. Even though the skin is relatively cool, it is a small percentage of the total extrudate thickness and is therefore oriented as the growth of cells within the structure causes a considerable stretch of the extrudate in both transverse and longitudinal directions.

In the course of this surface cooling, a sheet structure is provided which, in cross section, comprises an expanded or foamed base area of a density of from less than 1 lb. to 10 lbs. per cubic foot, preferably less than 3 lbs. per cubic foot, with an integral, unexpanded skin covering of a density of from 50 to 80 lbs. per cubic foot, or substantially the same density as the resin stock prior to being extruded. This skin may be from 0.001 to 0.005 of an inch thick or from 0.05 percent to 5 percent of the thickness of the foamed area. The overall sheet may be from one-sixteenth inch to one-half inch thick, depending upon the desired use of the article formed therefrom.

Figure 4:
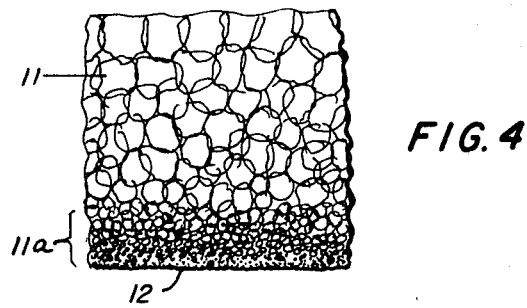
FIG. 4 is drawn from a microphotograph, illustrating the actual cross section of a tray or sheet of foamed and skin-coated thermoplastic, where the foamed inner structure is shown as open celled.

As hereinafter described and seen in FIGS. 4 and 5, the density of the open-celled foamed inner structure gradually increases as it approaches the unexpanded surface or surfaces where it terminates in an integral solid, unexpanded skin.

Figures 1, 2:
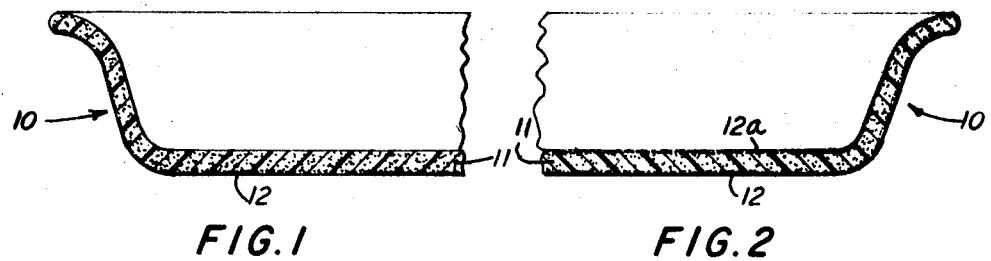
FIG. 1 is a fragmentary, cross-sectional view of one form of tray according to the present invention wherein one surface only is skin coated.
FIG. 2 illustrates a modified form of the invention wherein both surfaces are provided with an unexpanded skin.
Figure 3:
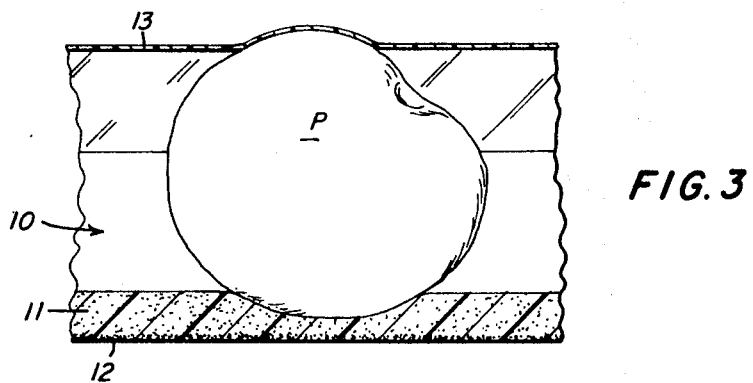

In the drawings, referring first to FIG. 1, the invention may be embodied in a tray or the like, generally represented by the numeral 10, comprising a foamed layer of thermoplastic material 11, the outer surface 12 of which is formed of the same material but unexpanded so as to provide a relatively thin, solid skin which not only sheaths the foamed material but adds stiffness to the entire tray. The skin 12 follows the natural shape of the tray when formed or molded, and, together with the foamed inner structure, provides sufficient overall stiffness for good handling characteristics. Furthermore, as will be seen from FIG. 3, this foamed inner structure 11, which is open-celled and permanently deformable as distinguished from elastic, provides a particularly advantageous characteristic in the packaging of fruits, such as the plum P or similar fruits of spherical shape. If the tray is manufactured of certain thermoplastic materials such as polystyrene, polyvinylchloride, polyethylene and polypropylene for example, which are not elastic, the deformation above referred to becomes a permanent nest or recess for the particular shape involved. Therefore, the product is held in position when it is overwrapped by the usual transparent film 13, as it has reproduced its own shape in the bottom of the tray, which, until the fruit is removed after the package is opened, maintains uniform pressure on the fruit and minimizes bruising.

In the production of an extruded sheet having the desired open-celled inner structure above referred to, which has an important effect on the relatively permanent deformability of selected areas of the tray or other final packaging product, it is necessary to employ the proper thermoplastic material and blowing agent and operate under temperature conditions whereby the cells of the extruded inner structure 11 become sufficiently large, and their covering sufficiently weak, to rupture and produce the open cells. In other words, the membrane between the cell connections and junctions draws back or stretches until it breaks. For example, by employing 100 parts styrene as the basic charging stock with 15 to 20 parts of a selected blowing agent, such as pentane, and operating at temperatures, of from 250° F. to 350° F., preferably 300° F., the inner structure of the extruded sheet would be open celled at least to the extent desired. Also, in another example, by employing 100 parts of polyvinylchloride and 15 to 20 parts of selected blowing agent, such as acetone or a fluorocarbon, at temperatures of 250° F. to 350° F., the inner structure of the extruded sheet would be open celled to the desired extent. Where gas under pressure is used as a blowing agent, a solvent should be added. To determine the extent of open cells in this inner structure, the quantity of the blowing agent employed, as well as the temperature, are important. The more blowing agent used, the lower is the viscosity of the extrudate, and this is determinative of when the walls of the cells break. The higher the temperature and the more soluble the blowing agent used, the larger will be the cell size and the less the viscosity, and the sooner the cells break.

With an open-celled structure, such as this, the deformability of the sheet is facilitated. Styrene material is basically rigid, and if open celled, it will collapse easier, as the air or gas in the cells will not resist pressure, and the cells will remain deformed or depressed in selected areas and will not rebound to the original shape of the extrudate.

The biaxial orientation of the skin is primarily effective in that it increases the strength of the product, and when this is combined with the open-celled structure providing deformability, the resulting tray or product becomes more suitable for the desired purpose of packaging fruit, etc.

The modified form of the invention shown in FIG. 2 comprises a generally similar tray designed to provide greater stiffness, and, to this end, both the outer surface 12 and the inner surface 12a are covered with the unexpanded, integral skin between which the expanded layer 11 is sandwiched.

Although not shown in the drawings, it is also contemplated within the spirit of the invention to provide a tray wherein the inner surface only is unexpanded to expose an outer surface of foamed or expanded material. In other words, it may be desirable that the outer surface of the tray be softer than the solid skin, particularly when it is important to minimize surface marring.

Figure 5:
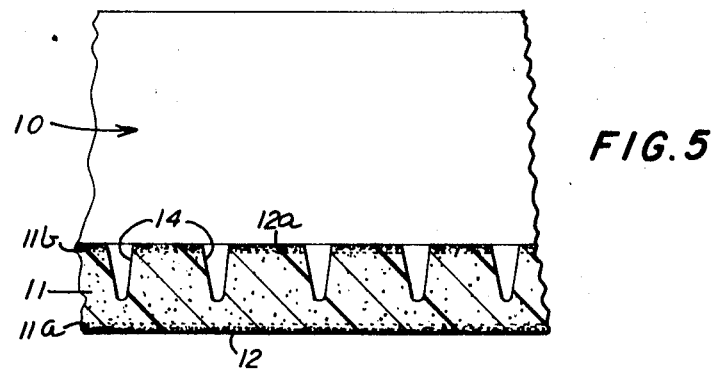
FIG. 5 is an enlarged, fragmentary, cross-sectional view showing a modification of the invention as embodied in a meat-packaging tray.

FIG. 5 illustrates an embodiment of the invention in the form of a container or tray, especially useful in the packaging of meat, poultry or other products where moisture absorption is desirable. Normally, foamed plastic trays are constructed with closed cells in order to optimize rigidity. However, inasmuch as closed cells are nonabsorbent, these trays are not satisfactory where moisture absorbency is required. Therefore, in this form of the invention, the inner skin 12a is provided with a series of apertures 14 which, for example, may be thirty one-thousandths of an inch in diameter and spaced on ½-inch centers. The inner layer 11 is formed of open cells or a combination of open and closed cells, and the density of the layer increases as the outer skin 12 is approached, as indicated at 11a, the same being true with respect to the density at 11b as the layer 11 approaches the inner skin 12a. The apertures 14 which penetrate the inner skin 12a extend deep enough into the layer 11 to reach the open-celled portions of the structure, thus providing a path for the fluids from the packaged meat products to pass through the nonabsorbent surface and be absorbed by the inner absorbent area. An outer skin is not necessary here.

One advantage of a meat tray of the type shown in FIG. 5 is that it retains all of the attributes of a nonabsorbent plastic tray, and, at the same time, provides absorbency without weakening the tray or affecting its appearance. Being nonabsorbent on its inner skin, it does not adhere to the product contained therein. This embodiment provides a continuous, integral structure from the high density skin, changing quickly to an absorbent open-celled interior or changing gradually to an absorbent, open-celled interior with a layer of closed cells between.

It may also be noted that in instances where a coloring medium is employed in the extrusion stock, the unexpanded outer skin, because of its greatly increased density, acquires a more accentuated color tone than that of the expanded inner structure.

It will be apparent that an integrally, skin-coated sheet of foamed thermoplastic material, such as contemplated by the present invention, is readily adaptable for forming various articles of manufacture. These may include, in addition to the formed trays illustrated, flat table mats, coasters, disposable plates, bowls, etc., and numerous specialized food- and produce-packaging items. In all such uses, the advantages of the foamed or cellular inner structure, combined with the integral skin or coating of the same basic material, represent a distinct advance in the art.

From the foregoing, it is believed that the invention may be readily understood by those skilled in the art without further description, it being borne in mind that numerous changes may be made in the details disclosed without departing from the spirit of the invention.

I claim:

1. A concave tray having a bottom and a peripheral wall, said bottom and wall comprising a layer of extruded, thermoplastic material having an expanded, substantially inelastic and permanently deformable open-celled inner structure of a density not greater than 3 pounds per cubic foot, and a relatively thin, unexpanded, biaxially oriented skin of said thermoplastic material, molecularly integral with said expanded structure, covering at least one surface of said layer to provide a stiffening shield.

2. A tray as claimed in claim 1, wherein the outer surface is covered by said skin, the inner surface being devoid of said skin, substantially inelastic, and permanently deformable.

3. A tray as claimed in claim 1, wherein both surfaces of said layer have a relatively thin, unexpanded, biaxially oriented skin of said thermoplastic material, molecularly integral with said expanded structure.

4. A tray as claimed in claim 1, wherein the thickness of said skin is from 0.05 percent to 5 percent of the thickness of said expanded structure.

5. A tray as claimed in claim 4, wherein said skin is from 0.001 to 0.005 of an inch thick.

6. A tray as claimed in claim 1, wherein the density of said skin is from 50 to 80 pounds per cubic foot.

7. A tray as claimed in claim 1, wherein the density of said layer gradually increases as it approaches said skin.

8. A tray as claimed in claim 7, wherein said layer also includes closed cells therein.

9. A tray as claimed in claim 1, wherein said skin covers the inner surface thereof, said expanded structure is substantially absorbent, and said skin is provided with a series of drain apertures communicating with the absorbent expanded structure.

10. A tray as claimed in claim 1, wherein the thermoplastic material is polystyrene.